April 3, 1962  J. W. LOEFFLER  3,027,817
AUTOMATIC COMPENSATING CONTROL FOR ARTICLE INTERCEPTORS
Filed Feb. 26, 1960  3 Sheets-Sheet 1

Inventor
John W. Loeffler
By H.R. Rather
Attorney

April 3, 1962 J. W. LOEFFLER 3,027,817
AUTOMATIC COMPENSATING CONTROL FOR ARTICLE INTERCEPTORS
Filed Feb. 26, 1960 3 Sheets-Sheet 2

Inventor
John W. Loeffler
By H.R. Rather
Attorney

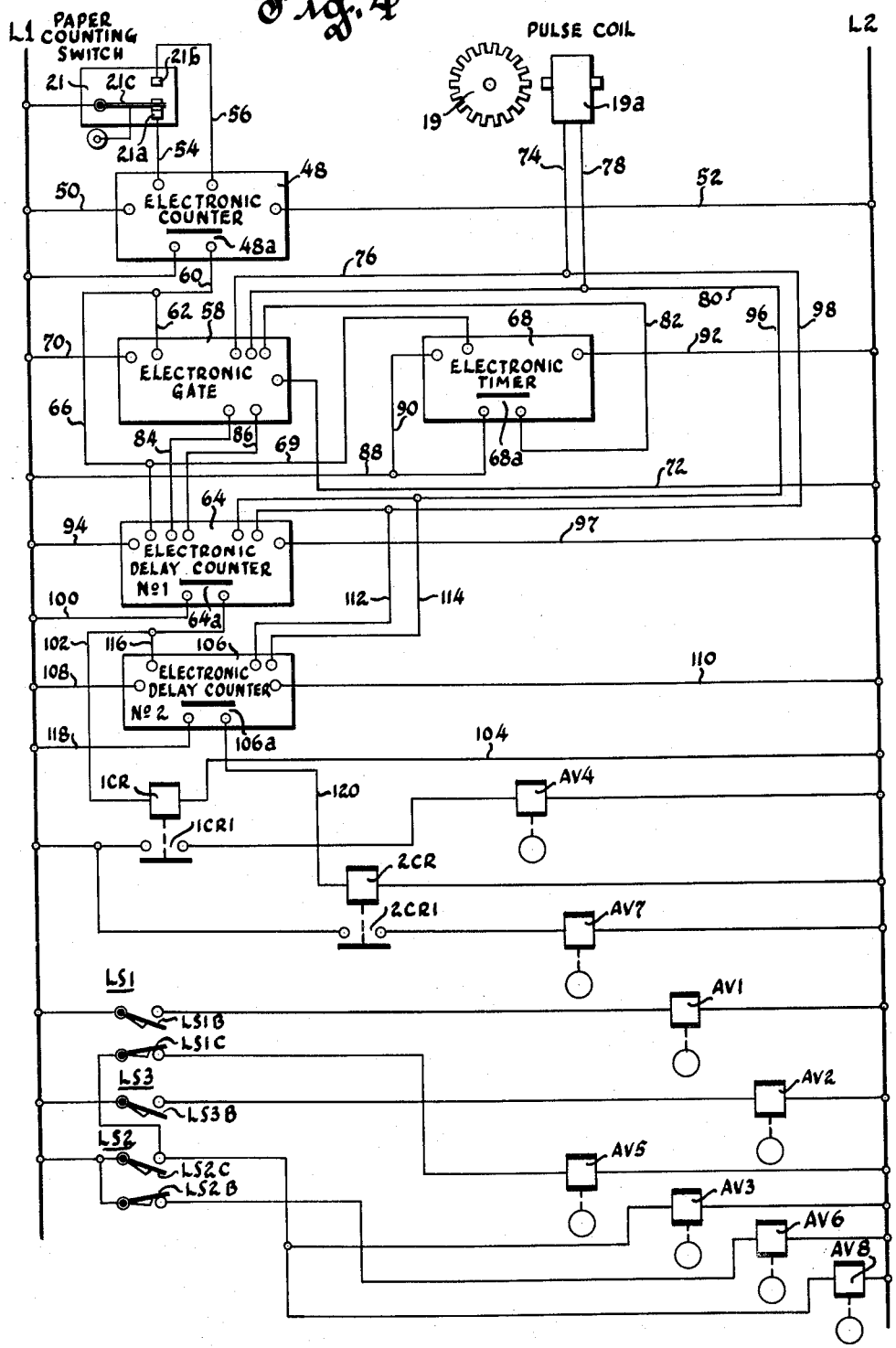

United States Patent Office
3,027,817
Patented Apr. 3, 1962

1

3,027,817
AUTOMATIC COMPENSATING CONTROL FOR ARTICLE INTERCEPTORS
John W. Loeffler, Milwaukee, Wis., assignor to Cutler-Hammer, Inc., Milwaukee, Wis., a corporation of Delaware
Filed Feb. 26, 1960, Ser. No. 11,356
8 Claims. (Cl. 93—93)

This invention relates to article handling apparatus and more particularly to automatic compensating control means for article interceptors.

While not limited thereto, the present invention is particularly suited for use with apparatus for counting and stacking newspapers and the like which are delivered at high speed in an overlapped continuous stream such as disclosed on the Howdle et al. Patent No. 2,819,661, and in a pending application, Serial No. 783,413, filed December 22, 1958, Theodore B. Jochem, inventor, which are both assigned to the assignee of the instant application.

The stacking or grouping of articles which are being delivered in closely spaced or in overlapped relation at high delivery speeds into segregated groups of preselected numbers of articles requires that articles of one group be diverted and temporarily stored while the stacking or bunching of articles of a preceding group of articles is completed and removed from the stacking or grouping station. Counting of the articles to afford segregation into desired groups is usually done at some point along the path of the article delivery conveyor ahead of the interception point of the divertor. The control means for diverting and intercepting devices used in repeating cycle stacking apparatus must take into account the time required for articles to travel between the counting point and the intercept point to initiate movement of the article interceptor or divertor at a moment that will insure its arrival at intercept position at just the right moment to intercept the first one of the articles to be temporarily stored. Control systems heretofore used have taken into account these distance and time factors in relation to the rate of article delivery to provide a delay interval which automatically varies inversely with the delivery conveyor speed.

It has been found that if the speed of the article delivery conveyor is increased or decreased widely from a normal, or base speed that such control systems must be manually adjusted to account for the constant fixed time required to initiate and complete movement of the divertor or interceptor to intercept position, or the latter may arrive too late or too early to intercept the right article.

It is a primary object of the present invention to provide an improved control system for article divertors or interceptors in stacking or grouping apparatus which automatically relates the distance articles move between the counting and intercept point and the rate the articles move between these points to the constant time required to initiate and complete movement of such divertors or interceptors, so that the latter will always arrive at their intercept positions at the right moment to intercept the correct articles regardless of wide variations in rate of speed of the article conveyor.

Another object is to provide a control system of the aforementioned type wherein control pulses generated at a rate in accordance with the speed of article delivery conveyor are supplied to time delay means at twice the normal rate of initial interval equal to the constant time of divertor or interceptor operation, and thereafter at the normal rate until the time delay means has totaled a predetermined number of such pulses.

A further object is to provide in such control means, electronic means which for the aforementioned initial

2 constant interval supply the time delay means with additional control pulses at the same rate they are supplied directly to the latter from the pulse generator and upon completion of the interval automatically stops the supply of such additional control pulses.

A still further specific object is to provide improved stacking apparatus for articles, such as newspapers and the like incorporating the aforementioned control system.

Other objects and advantages of the invention will hereinafter appear.

The accompanying drawings illustrate a preferred embodiment of the invention which will now be described in detail, it being understood that the embodiment is susceptible of modification with respect to details without departing from the scope of the appended claims.

In the drawings:

FIGURE 1 schematically shows, in side elevation, an article stacking apparatus to which the invention is applied;

FIGS. 2a, 2b and 2c are fragmentary views of a portion of the apparatus of FIG. 1 illustrating certain conditions that can occur in its operation if the invention is not used;

FIG. 3a graphically illustrates an alternating wave form of a signal produced by a control element for the aforementioned apparatus;

FIG. 4 is a diagrammatic showing of a complete control system for the apparatus of FIG. 1 which incorporates the invention.

Figure 1:
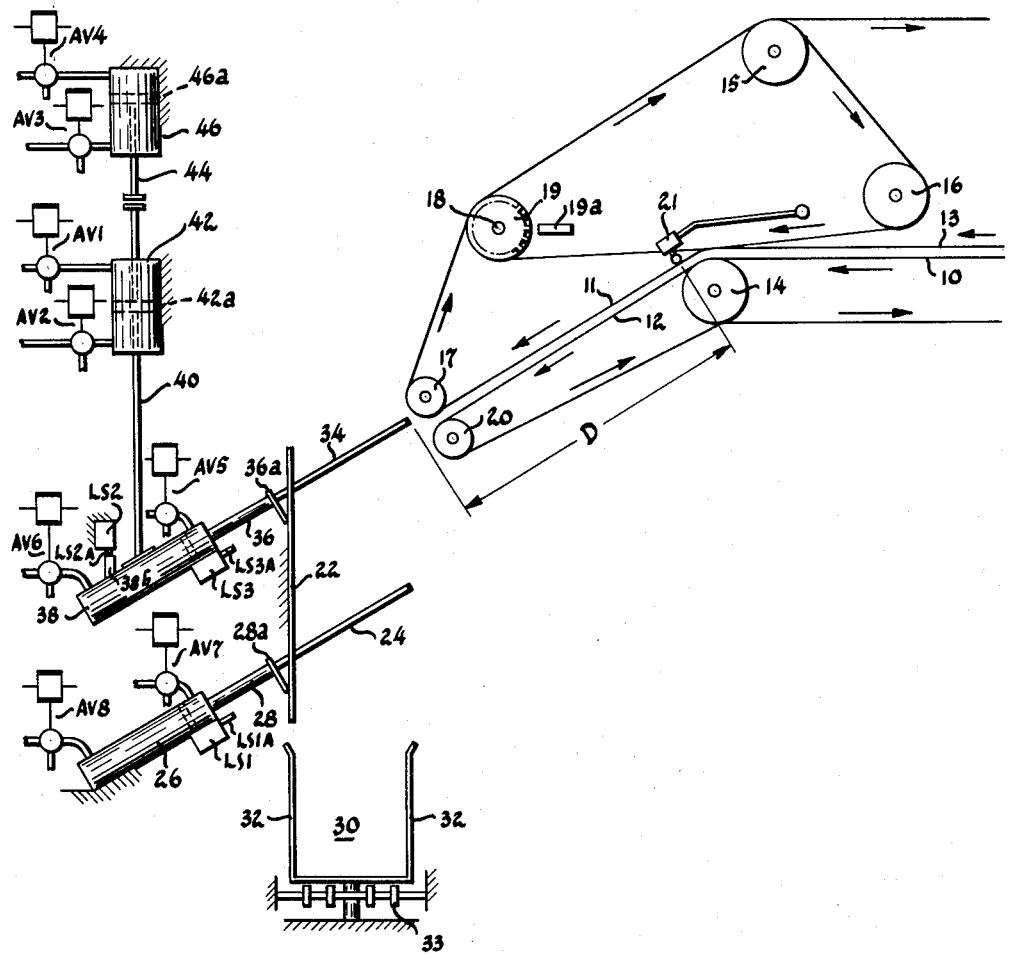

The stacking apparatus shown in FIG. 1 is substantially similar to that disclosed in the aforementioned Howdle et al. patent and Jochem application and comprises a conveyor-counting system, an article interception section, a batch stacking section, and a completed bundle transfer section.

The conveyor-counting section comprises sets of flexible wire belts 10, 11, 12 and 13 which are driven around grooved rollers in the direction of the arrows. Belt 10 is driven around the roller 14; belt 11 around the rollers 15, 16, 17 and a roller (not visible) to whose axle 18 a toothed sprocket or gear 19 is attached; belt 12 around the rollers 14 and 20; and belt 13 around the roller (not visible) on axle 18 and the roller 15. A magnetic induction or pulse coil 19a is located adjacent gear 19. Assuming that the conveyor is operating, a stream of newspapers in overlapped relationship will be conveyed between belt 10 and 13, over roller 14 and between belts 11 and 12. As each paper passes over roller 14, it effects operation of a counting switch 21 which rides upon belt 11. Each operation of the switch registers a count which is recorded and will hereinafter be described in connection with the control system of FIG. 4. A preferred form for counting switch 21 is disclosed in the Howdle et al. application, Serial No. 790,526, filed February 12, 1959.

The newspapers leave the conveyor-counting section of the stacker between the pincher rollers 17 and 20. The newspapers of a first count upon leaving the pincher rollers 17 and 20 continue in the forward direction under their momentum imparted by the conveyor belts, and drop under the force of gravity. Their forwarded momentum causes them to strike on their leading edges against the vertical, stationary stop member 22. After they strike member 22 they drop onto an inclined stacking blade 24 where they stack with their leading edges alined against member 22. As will be hereinafter more fully explained when the predetermined number of the first count of papers have been stacked on the blade 24 the latter is retracted to the left under the action of an air cylinder 26 which has a piston 26a connected to blade 24 by a rod 28. The retraction of blade 24 removes the support from under the stack of papers and they then drop onto a bundle table 30 which has vertical stack alining members 32. When one or more stacks are dropped onto table 30 it may be assumed that the completed bundle is driven off by power driven rollers 33.

The interceptor section comprises an inclined interceptor blade 34 which is normally positioned as shown in its upper non-intercept position when papers are being stacked on stacking blade 24. As will be hereinafter explained, at an appropriate interval following counting of the last paper in a predetermined count interceptor blade 34 is moved vertically downwardly from its upper non-intercept position a distance of approximately one inch to its initial intercept position wherein it intercepts the first paper of a succeeding count.

Blade 34 is connected through a rod 36 to a piston 38a which moves in an air cylinder 38 to retract blade 34 to the left and return it to its lateral position shown. Cylinder 38 is mounted on the end of a piston rod 40 which extends through a vertical air cylinder 42. Cylinder 42 has a piston 42a which is adapted to move rod 40, and hence cylinder 38, rod 36 and interceptor blade 34 vertically. At its upper end rod 40 has an abutment which is engageable by a corresponding abutment on the lower end of a rod 44, which at its upper end is connected to a piston 46a movable in an auxiliary vertical fluid power cylinder 46. As will be hereinafter more fully explained when valve AV4 at the upper end of cylinder 46 is energized to admit air under pressure into cylinder, piston 46a is driven downwardly to engage the upper end of rod 40 and thereafter drive rod 40, piston 42a cylinder 38, rod 36 and blade 34 downwardly approximately one inch.

Blade 34 in moving downwardly one inch drives into the paper stream to cause the last paper of the first predetermined count to pass thereunder and drop onto the stack formed on blade 24, and will cause the first paper, and a number of succeeding papers, in a second predetermined count to temporarily stack on its upper side. While the latter papers are being temporarily stacked on blade 34, stacking blade 24 is retracted to the left to drop the stack containing the first predetermined count of papers onto table 30 and thereafter is returned to the right to its stacking position shown. During the period when blade 24 goes through its retraction and return cycle, an air valve AV1 at the upper end of cylinder 42 is energized to admit air under pressure to drive rod 40 and hence blade 34 downwardly at a given rate to make room, vertically for papers to temporarily stack on blade 34 as they are discharged from pincher rollers 17 and 20. When stacking blade 24 returns to its stacking position an air valve AV5 at the right-hand end of cylinder 38 is energized to admit air to drive piston 38a, rod 36 and blade 34 to the left thereby causing the papers temporarily stacked thereon to drop onto stacking blade 24. Succeeding papers of a second or following predetermined count will thereafter drop and stack on top of the papers previously dropped onto blade 24 by retraction of interceptor blade 34.

During the interval when blade 34 is moved downwardly by movement of piston 42a, an air valve AV3 in the lower end of cylinder 46 is energized to drive piston 46a and rod 44 to their upper position depicted in FIGURE 1. When interceptor blade 34 reaches its retracted position an air valve AV2 in the lower end of cylinder 42 is energized to admit air to drive piston 42a, and hence retracted blade 34 and its power operating assembly upwardly. After blade 34 reaches its upper position depicted in FIGURE 1, an air valve AV6 in the left-hand end of cylinder 38 is energized to admit air to drive piston 38a, and hence blade 34 to the right to its position shown. Following count of the last paper in the second predetermined count, by counting switch 21, and elapse of a variable delay period, which will be hereinafter explained in detail, interceptor blade 34 is again moved downwardly the aforementioned one inch distance to its initial intercept position under the action of piston 46a, and the previously described operating cycles for blades 24 and 34 repeat.

A limit switch LS1 having an operator LS1A is mounted on the casing of cylinder 26 and is adapted to have such operator moved inwardly by engagement of a member 28a fixed on rod 28 when stacking blade 24 is moved to its retracted position. A second limit switch LS2 which is stationarily mounted has an operator LS2A which is engaged by an abutment 38b on the casing of cylinder 38 and moved inwardly in the position of the latter shown in FIG. 1. A third limit switch LS3 is mounted on the casing of cylinder 38 and has an operator LS3A which is moved inwardly by a member 36a secured on rod 36 when blade 34 is retracted to the left. The purpose and operation of limit switches LS1, LS2, and LS3 will be described hereinafter in detail in connection with the control system of FIG. 4.

Figure 2A:
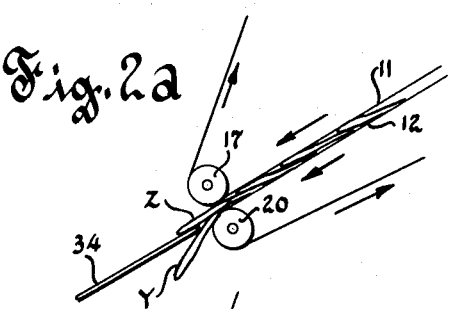
Figure 2B:
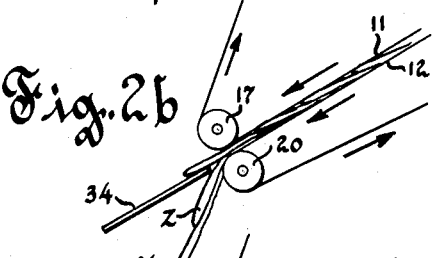
Figure 2C:
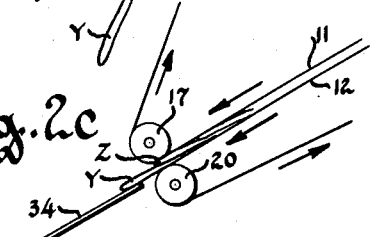

The leading edge of the last paper in any predetermined count must travel a fixed distance D between counting switch 21 and a point which will afford it interception by blade 34 when the latter is in its initial intercept position. Thus a time delay must be provided between the moment switch 21 responds to passage of the last paper in any given predetermined count to insure that blade 34 is moved into its initial intercept position just after, and not before, such last paper moves beyond the intercept point. In the control systems heretofore used this delay period was determined by production of a given number of pulses of a given polarity by a pulse wheel and induction coil, like pulsewheel 19 and coil 19a. The required number of pulses is determined by the number produced by operation of the conveyor while the leading edge of a paper travels the aforementioned distance D, from switch 21. Thus, by the time a control system responded to actuate and move interceptor blade 34 to its intercept position the last mentioned paper of a first predetermined count would move beyond the intercept point and drop onto stacking blade 24. This works satisfactorily so long as the delivery conveyor is delivering papers at an intermediate range of speeds. When the conveyor system operated at considerably higher speeds it has been found necessary to arbitrarily reduce the number of pulses to which the control system responds to move interceptor blade 34 to its intercept position, and conversely to increase the number of pulses when the conveyor operated at considerably slower than its intermediate speed. The reason for this will be apparent when FIGS. 2a, 2b and 2c are considered.

Assume, as a first example, that the conveyor is operating at a speed at which it delivers papers at an intermediate rate of 30,000 issues for hours. Further, let it be assumed that at that delivery rate it takes a paper one second (1 sec.) to travel the distance D. Also let it be assumed that the cycle time required to initiate and move interceptor blade 34 from its upper non-intercept position downwardly said one inch to its initial intercept position is a constant 0.07 sec. Additionally let it be assumed that the control system is set to respond and initiate such movement when it has received 40 pulses, and at 30,000 i.p.h. such number of pulses is produced in 0.93 second. Thus, as the pulse time (0.93 sec.) plus the interceptor blade cycle time (0.07 sec.) total 1 second, which is equal to the time it takes a paper to travel the distance D, interceptor blade 34 will arrive at its initial intercept position at the right moment to insure that the paper Y, the last paper in a first predetermined count will pass below it, and the following paper Z, the first paper of a second predetermined count will pass on top thereof as depicted in FIG. 2a.

Now let it be assumed, as a second example, that the speed of the conveyor is doubled to afford delivery at 60,000 i.p.h. Thus 40 pulses will then be counted in a time of 0.465 sec. and the travel time of a paper over the distance D will be halved to 0.5 sec. The cycle time to move interceptor blade 34 from its upper non-intercept position downwardly to its initial intercept position will however, remain constant at 0.07 sec. In this latter example, the paper travel time (0.5 sec.) will be less than the total of the pulse time (0.465 sec.) and the first interceptor blade cycle time (0.07 sec.), namely 0.535 sec. Thus interceptor blade will arrive at its initial intercept position too late to intercept paper Z, the first paper of the second predetermined count, which may assume to pass below blade 34 as shown in FIG. 2b and erroneously be included with the papers of the first predetermined count.

Now let it be assumed, as a third example, that the conveyor speed is halved to afford delivery of papers at a rate of 15,000 i.p.h. 40 Pulses will then be counted in 1.86 secs. and the travel time of a paper over the distance D will be increased to 2 secs. As 1.86 plus 0.07 secs. equal 1.93 secs., blade 34 will arrive at its initial intercept position 0.07 sec. too early, and will cause paper Y to erroneously pass on top thereof, as depicted in FIG. 2c, instead of completing the batch being stacked on stacking blade 24.

From the foregoing examples, it will be apparent that to insure interceptor blade 34's arrival at its initial intercept position at the right moment to intercept the first paper of the second or succeeding predetermined count that the following equation must be satisfied:

$$T_1 = T_2 + T_3 \qquad (1)$$

Where:

$T_1$ = travel time for a paper over distance D at a given conveyor speed $T_2$ = the time required to produce a given number of pulses at such conveyor speed and $T_3$ = the constant time required to initiate and move the interceptor blade to its initial intercept position.

As will be seen from the foregoing examples, $T_1$ will vary inversely with speed, and $T_2$, assuming a fixed number of pulses, will also vary inversely with speed. Thus to insure balance of the above equation, either $T_1$ or $T_2$ must be adjusted. As the paper travel time $T_1$ is a condition that cannot be altered, only adjustment of $T_2$ can be resorted to.

In the control system of the present invention, which will hereinafter be described in detail, I provide an electronic delay counter that is set to respond to a fixed number of pulses to initiate operation and movement of interceptor blade 34 to its initial intercept position, which is in accordance with previous practice as disclosed in the aforementioned Howdle et al. patent and Jochem application. However, from the instant switch 21 completes its count of the last paper in a first predetermined count until a period equal to the constant first cycle time of the interceptor blade $T_3$ (0.07 sec.) in one preferred embodiment I subject the electronic delay counter to twice the number of pulses than would normally be delivered by prior practice. Thereafter, for a variable time, which is dependent upon the rate of conveyor operation, I supply the electronic delay counter with pulses at a normal rate until it has received the aforementioned fixed number of pulses.

Reference will be made to the foregoing first and second examples and Equation 1 to demonstrate mathematically how this expedient works. Considering $T_2$ in the Equation 1 the same can be mathematically represented as follows when such expedient is used;

$$T_2 = T_3 + T_v \qquad (2)$$

where $T_v$ is a variable period of time which is a function of the conveyor speed. Now substituting for $T_2$ in the Equation 1;

$$T_1 = T_3 + T_v + T_3 \qquad (3)$$
$$T_1 = T_v + 2T_3 \qquad (4)$$

Assume the same conditions as in the first example, namely, 30,000 i.p.h., $T_1 = 1$ sec., $T_3 = 0.07$ sec. and that the electronic delay counter functions upon receipt of 40 pulses.

Then substituting in the Equation 4 we have
Then substituting in the Equation 4 we have $$1 = T_v + (2 \times .07)$$
$$T_v = 1 - .14$$
$$T_v = 0.86 \text{ sec.}$$

At the conveyor speed affording a 1 sec. travel time of the paper to the intercept point, pulses will be generated at the rate of 40 pulses/sec. In the first 0.7 sec., $40 \times .07$, or 2.8 pulses would normally be sent to the electronic delay counter. If we double the number of such pulses to 5.6 during the same period, then $40 - 5.6$ or 34.4 additional pulses must be fed to such device during the following interval $T_v$ (0.86 sec.). As the pulse rate is 40 pulses/sec. if we multiply the latter by 0.86 we achieve an answer of 34.4 pulses.

Now let it be assumed the conveyor, as in the second example, is running at 60,000 i.p.h. and that $T_1 = 0.5$ sec., $T_3 = 0.07$ sec., and that the pulse rate is doubled to 80 pulses/sec. First substituting in Equation 4.

$$0.5 = T_v + (2 \times .07)$$
$$T_v = 0.5 - .14$$
$$T_v = 0.46 \text{ sec.}$$

In the interval $T_3$, $80 \times .07 \times 2$, or 11.2 pulses will be fed to the electronic delay counter, leaving $40 - 11.2$ or 28.8 pulses that must be supplied during the interval $T_v$. As the pulse rate is 80 pulses/sec. if we multiply 80 by 0.46 we arrive at a result of 28.8 pulses.

Figure 3A:
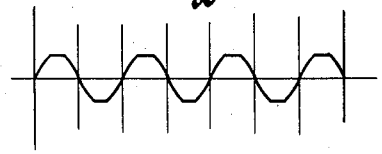
FIG. 3b is similar to 3a but shows the portion of such wave used in prior art control systems for such apparatus.
FIG. 3c is similar to FIGS. 3a and 3b, but shows how both portions of the wave are used in the control system of this invention during a certain interval.
FIG. 3d illustrates the pattern of control pulses used in the control system of this invention in a certain portion of the cycle of operation of the apparatus of FIG. 1.
Figure 3B:
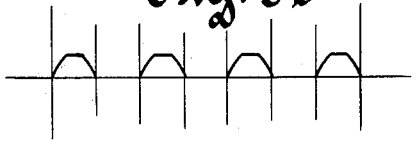
Figure 3C:
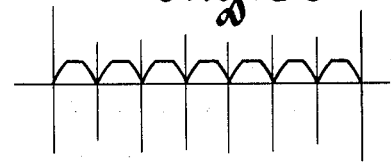

Due to the shape of the teeth and spaces between the teeth of pulse wheel 19, a substantially sine wave type alternating current will be induced in coil 19a as depicted in FIG. 3a. Heretofore only the positive portion of pulses of such alternating current has been fed to the electronic time delay counter as depicted by the spaced positive pulses in FIG. 3b. As will be described in detail in connection with the control circuit of FIG. 4, during the interval following initiation of operation of the electronic delay time, equal to $T_3$, I supply the latter with phase inverted negative portion of pulse of such alternating current in addition to the normal positive pulses generated in coil 19a, to thereby subject it to twice the number of pulses at any given pulse rate. At a given pulse rate, corresponding to some given conveyor speed, the pulse pattern supplied to the electronic delay counter will for the interval $T_3$ be that depicted in FIG. 3c.

Figure 3D:
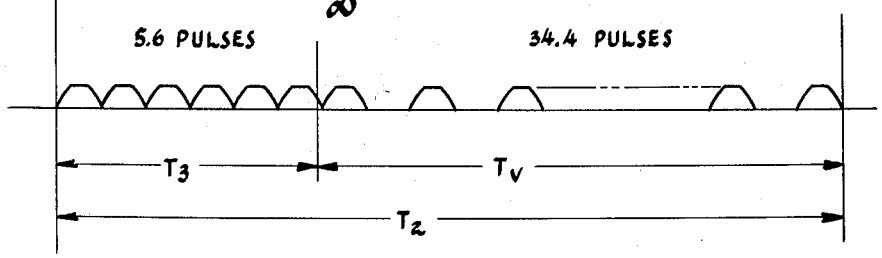

Under the operating conditions assumed in connection with the aforementioned first example, the control system incorporating the invention will have a complete pulse pattern as depicted in FIG. 3d.

Now considering FIG. 4, it shows an electronic counter 48 which has connections to A.C. power supply lines L1 and L2 through conductors 50 and 52. Counter 48 is also connected to contacts 21a and 21b of count switch 21 through lines 54 and 56, respectively. It may be assumed that for counter 48 to register a count the movable contactor 21c of switch 21 must move to close with stationary contact 21b and then reclose to stationary contact 21a. Counter 48 is schematically represented as closing a contact 48a momentarily upon registration of a predetermined count to feed a signal pulse to electronic gate 58 through lines 60 and 62, also to electronic delay counter 64 through lines 60 and 66, and also to electronic timer 68 through lines 60, 66 and 69.

Electronic gate 58 is connected to receive operating power from lines L1 and L2 through lines 70 and 72. Lines 74—76 and 78—80 provide signal input connections to gate 58 from pulse coil 19a. Gate 58 has an additional input connection through the line 82 to electronic timer 68. It may be assumed that upon receipt of the aforementioned signal pulse for counter 48 that gate 58 functions to supply phase inverted, negative pulses derived from pulse coil 19a through the lines 84 and 86 to electronic delay counter 64 for the interval $T_3$ which is terminable by time-out of electronic timer 68 as will be hereinafter explained.

Electronic timer 68 is connected to receive operating power from lines L1 and L2 through lines 88—90 and 92. It may be assumed that after it receives the signal pulse from counter 48 that it immediately sends a signal, schematically depicted by closure of contacts 48a, derived from lines L1 and L2 and conveyed through lines 88, contacts 68a and line 82, to electronic gate 58. It may further be assumed that the latter signal causes gate 58 to respond to accept negative pulses from coil 19a, phase invert them and send them through lines 84 and 86, to delay counter 64. The aforementioned signal received by timer 68 from counter 48 also starts its timing action which upon completion interrupts the signal output to gate 58, schematically depicted by reopening of contact 68a. It may be assumed that electronic timer 68 is set to stop the signal output to gate 58 upon elapse of an inerval equal to $T_3$. Upon cut-off of the signal from timer 68, gate 58 may be assumed to immediately stop supply of the phase inverted negative pulses, derived from coil 19a to electronic delay counter 64.

Electronic delay counter 64 is connected to receive operating power from lines L1 and L2 through lines 94—97 and is connected to receive pulses directly from coil 19a through lines 74—98 and 78—96. It may be assumed that of the pulses derivable directly from coil 19a that delay counter 64 only responds to positive pulses. Further, it may be assumed that upon receipt of a fixed number of pulses directly from coil 19a, and through gate 58 as aforedescribed for the initial period $T_3$, that delay counter acts to momentarily energize an electromagnetic relay 1CR through lines 100—102—104, schematically depicted by closure of contacts 64a.

The control system is provided with a second electronic delay counter 106 which is connected to lines L1 and L2 to receive operating power through lines 108—110. Delay counter 106 is connected through lines 112—98—74 and 114—96—78 to coil 19a and may be assumed, when operating, to respond only to positive pulses induced therein. By means of its connection to the output circuit of delay counter 64, through lines 102—116 delay counter 106 is set in operation to receive such positive pulses, and upon receipt of a predetermined fixed number to complete an energizing circuit, schematically depicted by closure of contacts 106a, for a relay 2CR through lines 118—120.

Relay 1CR has normally open contacts 1CR1 which upon energization of the relay close to complete an energizing circuit for the operating winding valve AV4 across lines L1 and L2. As hereinbefore described when the operating winding of valve AV4 is energized it admits air into cylinder 46 to drive rod 44, rod 40, and hence interceptor blade 34 downwardly approximately one inch to its initial intercept position in line with the delivery end of the conveyor. The time between the moment energizing connections are completed to relay 1CR and interceptor blade 34 arrives at its initial intercept position is the constant time $T_3$ hereinbefore referred to.

Relay 2CR has normally open contacts 2CR1 which upon energization of the relay close to complete an energizing circuit for the operating winding of valve AV7 across lines L1 and L2. Thus valve AV7 will be opened at a variable interval following initiation of movement of interceptor blade 34 to its initial intercept position, to insure that the last paper of a first predetermined count is afforded time to come to rest on top of the stack on stacking blade 24 before cylinder 26 is energized to drive the latter to its left-hand retracted position to drop the completed stack onto bundle table 36.

The control system additionally includes the aforementioned limit switches LS1, LS2 and LS3 for controlling the sequence of energization of air valves AV1, AV2, AV3, AV5, AV6 and AV8. Limit switch LS1 has contacts LS1B and LS1C which move the operating positions shown in FIG. 4 when blade 24 is in its right-hand stacking position. Lines L1 and L2, thereby energizing cylinder 42 to move interceptor blade 34 downwardly from its initial intercept position as papers are temporarily stacked thereon.

Limit switch LS2 has contacts LS2B and LS2C. When the power operating assembly for interceptor blade 34 is in the position depicted in FIG. 1, it may be assumed that contacts LS2B will be closed and contacts LS2C will be open as shown in FIG. 4. In the closed position of contact LS2B energizing connections are completed for valve AV6 across lines L1 and L2. Thus air will be maintained in the left end of cylinder 38 to hold interceptor blade 34 in its left-hand position. Limit switch LS3 has a single set of contacts LS3B which assume the position shown when its operator LS3A is in extended position depicted in FIG. 1.

As will be seen, when air valve AV7 is opened, as a result of relay 2CR, stacking blade 24 will be retracted to the left and limit switch LS1 will consequently be operated to close its contacts LS1B and open its contacts LS1C. Closure of contacts LS1B results in completion of an energizing count for valve AV1 across lines L1 and L2, thereby energizing cylinder 42 to move interceptor blade 34 downwardly from its initial intercept position as papers temporarily stack thereon. As blade 34 and its power cylinder 38 move downwardly limit switch LS2 is released and its contacts LS2B open and its contacts LS2C close. Opening of contacts LS2B deenergizes the control winding of valve AV6 which then exhausts air from the left-hand end of cylinder 38. Closure of contacts LS2C results in completion of an energizing count for the control winding of valve AV8 across lines L1 and L2. Valve AV8 then opens to drive the retracted stacking blade 24 back to its right-hand stacking position. Blade 24 in moving out of its retracted position releases operator LS1A of limit switch LS1 and contacts LS1B open deenergizing the operating winding of valve AV1. Contacts LS1C simultaneously reclose completing an energizing count for valve AV5 through the then closed contacts LS2C of limit switch LS2 across lines L1 and L2. Valve AV5 then opens to admit air in the right-hand end of cylinder 38 to drive interceptor blade 34 to its left-hand retracted position. The reclosure of contact LS2C also results in completion of an energizing circuit for the operating winding of valve AV3 across lines L1 and L2. Valve AV3 opens to admit air into the lower end of cylinder 46 to drive piston 46a and rod 44 upwardly to the position shown in FIG. 1.

When blade 34 moves into its retracted position, operator LS3A of limit switch LS3 is operated to close contacts LS3B to complete an energizing circuit for valve AV3 across lines L1 and L2. Valve AV2 then opens to admit air into the lower end of cylinder 42 to drive the then retracted blade 34 and its power cylinder 38 upwardly to their original vertical positions depicted in FIG. 1.

As power cylinder 38 moves upwardly, operator LS2A of limit switch LS2 is operated and its contact LS2B recloses to again open valve AV6 to admit air to the left-hand end of cylinder 38 to afford drive of blade 34 from its retracted to its upper-non-intercept position shown in FIG. 1. Contacts LS2C simultaneously reopen to interrupt the energizing circuit for valves AV3 and AV8 whereupon air is released from the lower end of cylinder 46 to the left end of cylinder 36. The control system will then have returned to the condition depicted in FIG. 4, and the stacking blade 24 and interceptor blade 34 will then be in their original positions shown in FIG. 1.

I claim:

1. In a control system for article grouping apparatus which has an article delivery conveyor operable at a variable rate and an article diverter operable to divert articles temporarily during each cycle, in combination, means energizable to move the divertor from a non-intercept to an intercept position in relation to the delivery end of the conveyor, counting means for counting each article at a fixed point ahead of the delivery end of the conveyor, and control means responsive to said counting means to energize the first mentioned means following completion of a count of predetermined numbers of the articles, said control means comprising means generating control pulses at a rate in accordance with the conveyor speed, means responsive to a fixed number of said pulses to initiate energization of said first mentioned means, and means responsive to completion of the count of each group of articles to subject the last mentioned means to additional pulses derived from the pulse generating means for an interval equal to the constant time required to initiate and complete movement of said divertor to its article intercept position.

2. The combination according to claim 1, wherein said means responsive to a fixed number of pulses responds only to pulses of a given polarity generated by the pulse generating means, and wherein the last specified means responds to pulses of the opposite polarity generated by said pulse generating means inverts them to said given polarity and feeds them to said means responsive to said fixed number of pulses during the aforementioned interval.

3. The combination according to claim 2, wherein said last specified means includes pulse gating and inverting means and timing means for controlling the period when said pulse gating and inverting means are effective.

4. The combination according to claim 1, wherein said control means comprises a toothed pulse wheel driven at a rate in accordance with the conveyor speed, an induction coil in which positive and negative pulses are induced at a frequency corresponding to the speed of the pulse wheel, an electronic delay counter in circuit with said counting means and said induction coil and responsive to a predetermined number of pulses of one polarity following initiation of its operation by said counting means to energize said first mentioned means, and electronic means in circuit with said counting means, said induction coil and said delay counter and including pulse polarity inverting means and timing means responsive to the same initiating action by said counting means as said delay counter to invert pulses of opposite polarity induced in said induction coil to that of said one polarity and supply them to said delay counter for an interval equal to the aforementioned constant time.

5. In a repeating cycle stacking machine wherein articles are stacked in groups of articles of predetermined numbers, the combination with a conveyor for delivering articles at a variable rate, a member below the delivery end of said conveyor on which articles stack with their leading edges alined, power responsive means energizable to move said member to a retracted position affording removal of a completed stack of articles therefrom, an interceptor member movable from a non-intercept position to an intercept position in line with the delivery end of said conveyor to temporarily receive and stack articles while a stack is completed and removed from the first mentioned member, actuating means energizable to move said interceptor blade to its intercept position, counting means for counting each article at a fixed point ahead of the delivery end of the conveyor, and control means including means generating pulses of opposite polarities at a frequency in accordance with the conveyor speed, means activated upon completion of each count of predetermined numbers of articles by said counting means to receive pulses of one polarity and initiate energization of said actuating means upon receipt of a fixed number thereof, and means actuated concurrently with the last mentioned means to receive pulses of the other polarity, invert them to said one polarity and supply the latter to said last mentioned means for a timed interval equal the constant time required to initiate energization of said actuating means and complete movement of said interceptor member to its intercept position.

6. The combination according to claim 5, together with means responsive to the energizing action of said last mentioned means to receive pulses from said pulse generating means and upon receipt of a given number thereof initiate energization of said power responsive means.

7. The combination according to claim 6, wherein said interceptor blade has second actuating means energizable to move it to a retracted position affording removal of the articles temporarily stacked thereon onto the first mentioned member and said control system includes limit switches responsive to movement of said first mentioned member to retract position to cause said power responsive means to return it to its stacking position and thereafter energize said second actuating means.

8. In a stacking machine for articles having a stacking station on which articles are stacked in batches and then removed, the combination with a conveyor for delivering articles at a variable rate to the stacking station, of an interceptor blade movable from a non-intercept position to an intercept position in line with the delivery end of said conveyor to temporarily receive and stack articles while a batch is being removed from said stacking station, actuating means for moving said interceptor blade from said non-intercept to said intercept position and requiring a constant time to initiate and complete such movement following energization thereof, counting means for counting each article as it passes a given point upstream from the delivery end of said conveyor, and control means under the direction of said counting means for energizing said actuating means following each count of a predetermined number of articles comprising means generating electrical pulses at a frequency corresponding to the rate of article movement, means responsive to a fixed number of such pulses to energize said actuating means, and means responsive to completion of the count of each group of articles to subject the last mentioned means to additional pulses for an interval equal to said constant time.

References Cited in the file of this patent

UNITED STATES PATENTS 2,819,661     Howdle et al.     Jan. 14, 1958